United States Patent [19]

Terada et al.

[11] Patent Number: 5,438,736
[45] Date of Patent: Aug. 8, 1995

[54] SWIVEL HOOK

[75] Inventors: Yasuharu Terada, Uozu; Tsuneo Suzuki, Kurobe; Hideyuki Matsushima; Yoshiyuki Horita, both of Toyama; Hiroaki Izumi, Kurobe, all of Japan

[73] Assignee: Yoshida Kogyo K.K., Tokyo, Japan

[21] Appl. No.: 235,344

[22] Filed: Apr. 29, 1994

[30] Foreign Application Priority Data

Apr. 30, 1993 [JP] Japan .............................. 5-028680 U
Aug. 26, 1993 [JP] Japan .............................. 5-051135 U

[51] Int. Cl.6 ............................................. A44B 13/00
[52] U.S. Cl. ................................. 24/599.8; 24/265 H
[58] Field of Search ............... 24/265 H, 599.8, 599.7, 24/599.6, 599.5, 599.4, 599.1, 599.9, 600.1, 600.2

[56] References Cited

U.S. PATENT DOCUMENTS

| 1,271,348 | 7/1918 | Moffitt | 24/599.8 X |
| 4,358,880 | 11/1982 | Garcia | 24/600.2 |
| 4,928,360 | 5/1990 | Wilbanks | 24/599.8 |
| 4,955,651 | 9/1990 | Barker | 24/599.8 X |

FOREIGN PATENT DOCUMENTS

| 0170811 | 2/1986 | European Pat. Off. . |
| 386020 | 6/1908 | France . |
| 57-45455 | 10/1982 | Japan . |
| 168187 | 9/1921 | United Kingdom . |

Primary Examiner—James R. Brittain
Attorney, Agent, or Firm—Hill, Steadman & Simpson

[57] ABSTRACT

A swivel hook comprises a hook body including a proximal part having an aperture formed at its upper end to define a pair of overhangs and a substantially J-shaped hook portion extending downward from the proximal part, an annular link having an connecting axle provided on one side thereof, the connecting axle having an enlarged head formed on its distal end, the enlarged head being inserted into the aperture into engagement with the overhangs; a locking member having a pair of opposing side walls defining therebetween a chamber; and biasing means mounted in the chamber. The proximal part of the hook body is pivotally mounted on the locking member within the chamber with the aperture closed by the opposing side walls and with the biasing means acting between the proximal part and the locking member for normally urging the locking member into engagement with the J-shaped hook portion.

4 Claims, 8 Drawing Sheets

SWIVEL HOOK

BACKGROUND OF THE INVENTION

1. Field of the Invention

The present invention relates to a swivel hook to be used on rucksacks, pack sacks, baggages, etc. and particularly relates to a swivel hook which is comprised of a hook body, a connecting ring pivotally mounted on the hook body, a locking member pivotally mounted on the hook body so as to firmly engage the tip of the hook body under the bias of a spring.

2. Description of Prior Art

Generally speaking, up to now, in order to assemble a swivel hook of the type described above, either of the two pieces, that is, the hook body or the connecting ting has a connecting axle and the other has a through hole, vice versa. After the connecting axle of one piece is fitted into the through hole of the other piece, the appropriate part of the other piece which surrounds the through hole is squeezed so as to firmly hold the two pieces together.

Instead of a squeezing operation, another type of conventional swivel hooks can be assembled by a snap-fitting operation, the typical example of which is disclosed in Japanese Utility Model Publication No. 57-45455. This conventional swivel hook is comprised of a substantially rectangular ring and a substantially J-shaped hook integrally formed with and disposed on a lower side of the rectangular ring. The rectangular ting is intended for receiving a belt therethrough. The proximal part of the J-shaped hook has a chamber formed for receiving a proximal part of a locking member therein. A shaft is mounted in the chamber of the J-shaped hook. The locking member has a dog-legged groove formed in the proximal part thereof. The dog-legged groove is open at one end and terminates in a bearing hole at the other end. The proximal part of the locking member also has a cavity formed therein. One end of a plate spring is inserted into the cavity of the locking member and the other end projects beyond the cavity.

In order to assemble this snap-fitting type swivel hook, for starters, one end of the plate spring is inserted into the cavity of the proximal part of the locking member. Then, the locking member is mounted on the hook body by fitting the shaft of the latter into the bearing hole through the dog-legged groove of the former. In this way, the other end projecting beyond the cavity comes into abutting engagement with the proximal end of the hook body, thus biasing the locking member into abutting engagement with the tip of the J-shaped body. This complete the assembling of the swivel hook.

However, these conventional swivel hooks suffer from drawbacks. The assembling of the first conventional swivel hook requires a squeezing operation which is tedious and time consuming. Following the manufacture of the separate parts, these parts are then plated or painted. The squeezing operation required to assemble the hook damages the painted or plated area, thereby damaging the appearance of the hook as a whole. Furthermore, the first swivel hook is limited in terms of the design, and therefore, the appearance which it can assume.

In case of the second conventional swivel hook, the hook body and the connecting ring are integrally formed with each other, which makes the swivel hook forfeit the freedom of assuming any desired appearance. If they were formed separately, hook bodies and connecting rings of various shapes and colors could be put together in any desired manner, so that the swivel hook could enjoy freedom of appearance. Since the both parts are integrally formed; if the hook body is desired to be made a little bigger, the swivel hook as a whole must be made bigger.

SUMMARY OF THE INVENTION

With the foregoing difficulties in view, it is therefore an object of the present invention to provide a swivel hook wherein a hook body and a connecting ring are made separately and subsequently the latter is pivotally mounted on the former; the hook body and connecting ring are joined so strongly that they should never come apart; and the manufacturing process of the swivel hook is very simple.

According to the present invention, there is provided a swivel hook comprising; a hook body including a proximal part having an aperture formed at its upper end to define a pair of overhangs and a substantially J-shaped hook portion extending downward from the proximal part; a connecting ring having an connecting axle provided on one side thereof, the connecting axle having an enlarged head formed on its distal end, the enlarged head being inserted into the aperture into engagement with the overhangs; a locking member having a pair of opposing side walls defining there between a chamber; and biasing means mounted in the chamber; the proximal part of the hook body being pivotally mounted on the locking member within the chamber with the aperture closed by the opposing side walls and with the biasing means acting between the proximal part and the locking member for normally urging the locking member into engagement with the J-shaped hook portion.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Some preferred characteristics of the present invention will be described in conjunction with the drawings attached hereto.

FIGS. 1 through 5 show the first embodiment. A swivel hook according to the first embodiment is broadly comprised of a substantially arcuate hook body 10; an annular connecting ring 12; an arcuate locking member 16 and a pair of spiral springs 18, 18 as biasing means, all made of metal.

Figure 1:
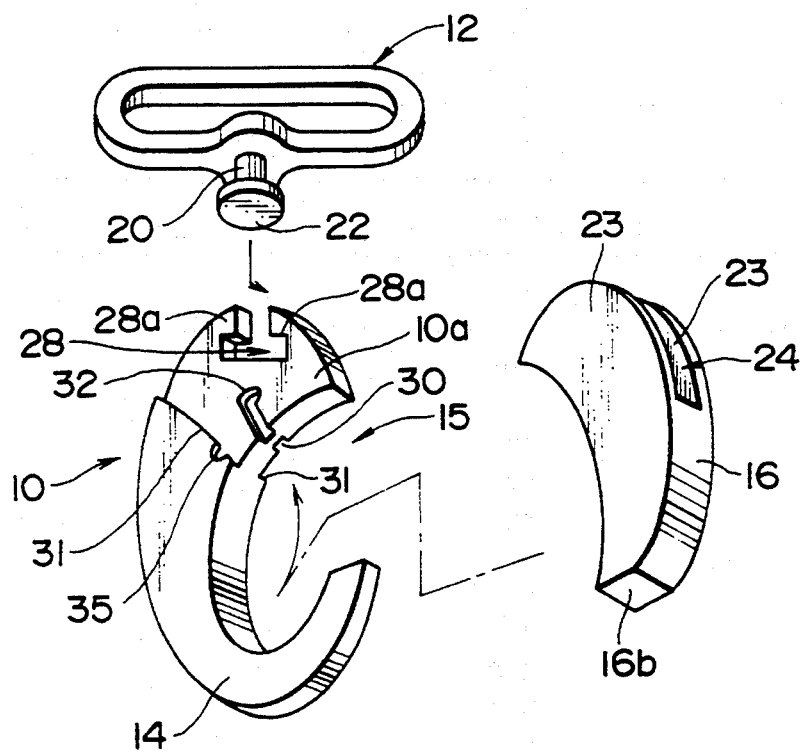
FIG. 1 is an exploded perspective view of a swivel hook according to the first embodiment of the present invention.

As better shown in FIG. 1, the hook body 10 has a proximal part 10a and a J-shaped hook portion 14 integrally formed with and extending downward from the proximal part 10a, to thus define a gap 15 with the inner side of the proximal part 10a. The proximal part 10a is slightly less in width than the hook portion 14, thus defining therebeween a pair of shoulders 31, 31 disposed one on each side of the hook body 10 at the corresponding positions. Each shoulder 31 has a notch 35 formed in the edge thereof at a position corresponding to that of the other notch 35. The proximal part 10a of the hook body 10 has an inverted T-shaped aperture 28 formed in the apex to thus define a pair of opposed overhangs 28, 28 on the opposite sides thereof. The inverted T-shaped aperture 28 is complementary in shape to a connecting axle 20 and an enlarged head 22 of the connecting ring 12 referred to hereinbelow. The proximal part 10a also has a pair of doglegged grooves 30, 30 formed one on each side thereof in corresponding positions. Each doglegged groove 30 has one end open in the inner side of the hook body 10 and has the other end terminate in a bearing recess 32.

As better shown in FIG. 1, the connecting ring 12 has a connecting axle 20 formed on one side thereof and extending outward from that side. The connecting axle 20 has an enlarged head 22 formed on the distal end.

As shown in FIG. 1, the arcuate locking member 16 is bifurcated at its upper part to provide a pair of opposed side walls 23, 23, thus defining a chamber 24 therebetween. The distance between the opposed side walls 23, 23 is slightly greater than the width of the proximal part 10a of the hook body 10. Each side wall 23 of the locking member 16 has a shaft 19 provided on its inner surface in the middle and disposed in coaxial relation to the matching shaft 19 of the other side wall 23. Additionally, a lower solid portion 16a of the locking member 16 has a notch 25 formed therein and disposed in the chamber 24.

Figure 2:
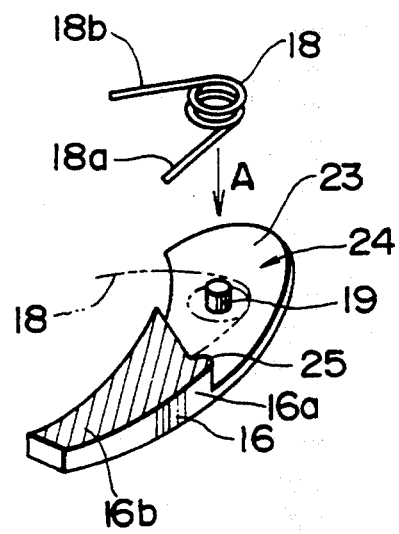
FIG. 2 is a perspective view, partly in cross-section, of a spiral spring and a locking member of the swivel hook of FIG. 1.

In order to assemble the swivel hook according to the first embodiment, as shown in FIG. 1; a pair of springs 18, 18 are mounted one on each shaft 19 as indicated by the arrow mark A in FIG. 2. One end 18a of each spring 18 is engaged with the notch 25 of the locking member 16. Then, the enlarged head 22 and the connecting axle 20 of the connecting ring 12 are inserted into the inverted T-shaped aperture 28 with the enlarged head 22 engaged with the opposed overhangs 28, 28. Subsequently, the locking member 16 is first placed within the area covered by the J-shaped hook portion 14 with the shafts 19 engaged in the dog-legged guide grooves 30. Then the locking member 16 is moved upward, causing the shafts 19, 19 to follow the line of the doglegged guide grooves 30 until the shafts 19, 19 come into bearing engagement with the bearing recesses 32. The other end 18b of each spiral spring 18 is engaged with the notch 35 of the hook body 10. This completes the assembling operation of the swivel hook. In this way, the spiral springs 18 function in dual manners; that is, they bias the shafts 19 against the bearing recesses 32 to thus retain the locking member 16 in position in the hook body 10 and simultaneously, they bias the locking member 16 so as to rotate the locking member 16 countrclockwise, as viewed in FIG. 3, to thus cause the tip 16b thereof engaged flush with the tip of the J-shaped hook portion 14.

Figure 3:
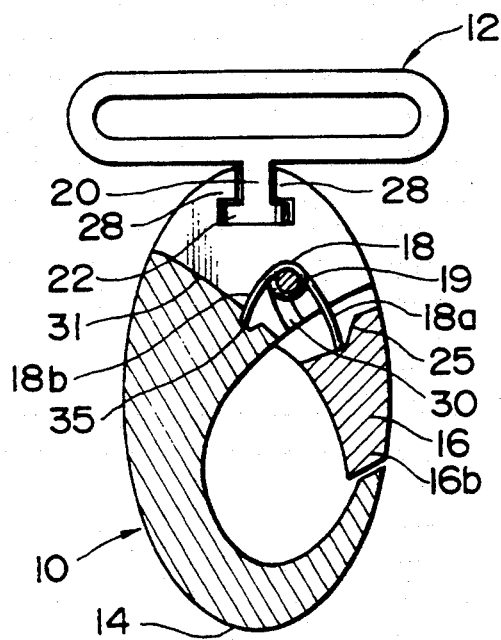
FIG. 3 is a longitudinal cross-sectional view of the swivel hook of FIG. 1, showing the locking member in closing disposition.
Figure 4:
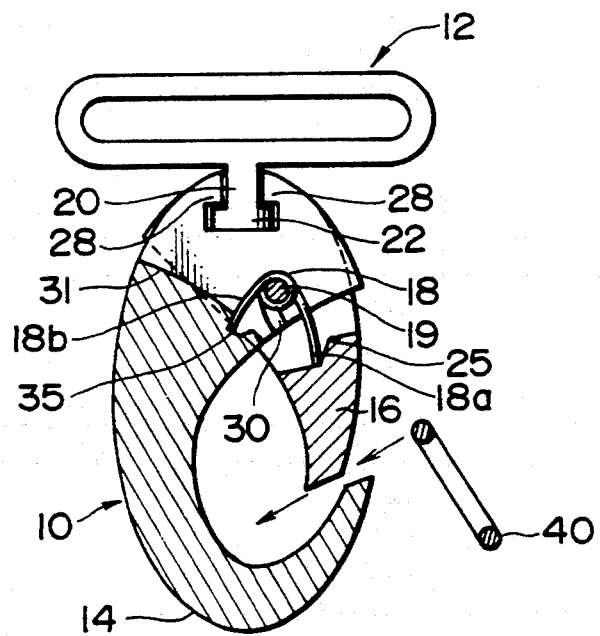
FIG. 4 is a view similar to FIG. 3 but showing the locking member in opening disposition.
Figure 5:
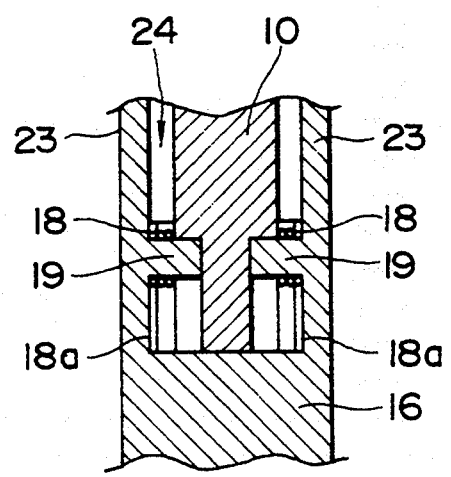
FIG. 5 is a fragmentary cross-sectional view of the swivel hook of FIG. 1.

In reference to usage of the assembled swivel hook, as shown in FIG. 3, the tip 16b of the locking member 16 normally fits flush with the tip of the J-shaped hook portion 14 to thus close the gap 15. In order to insert, for example, a separate ring 40 into the swivel hook, as shown in FIG. 4, it is necessary to press the locking member 16 inward to rotate it clockwise, as viewed in FIG. 4, against the resiliency of the spiral springs 18 to thus open the gap 15. Then, the ring 40 can be inserted into the J-shaped hook portion 14 through the gap 15. Subsequently, on releasing the locking member 16, the locking member 16 rotates around the shafts 19 counterclockwise, as viewed in FIG. 4, under the bias of the spiral spring 18, thereby closing the gap 15 and holding the ring 40 in the hook portion 14.

With the construction of the swivel hook according to the first embodiment set forth hereinabove, a mere snapping of the locking member 16 into position on the hook body 10 can cause the connecting ring 12 to be joined with the hook body 10 thereby dispensing with the tedious squeezing operation. This will decrease the number of steps required to assemble the swivel hook. Furthermore, the force with which the connecting ring 12 and the hook body 10 are engaged is very strong; and further still, the construction will provide freedom or flexibility to combine connecting rings and hook bodies of various sizes and colors.

Figure 6:
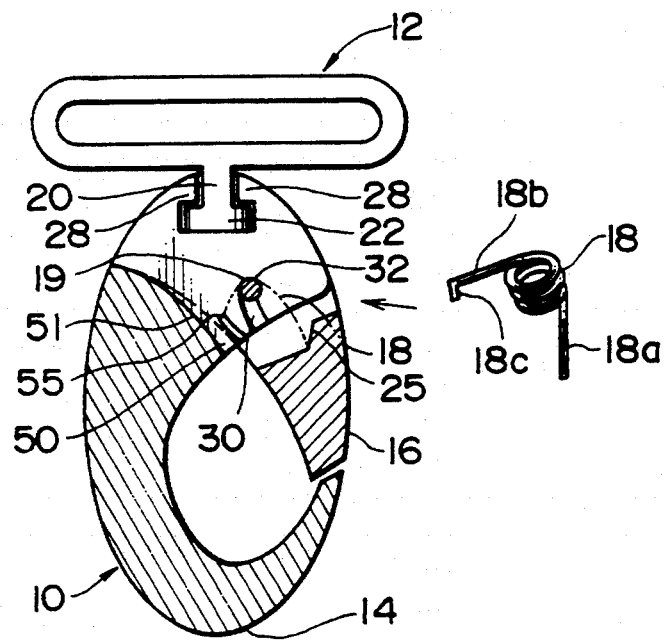
FIG. 6 is a longitudinal cross-sectional view of a swivel hook according to the second embodiment of the present invention.

Turning now to describing a swivel hook according to the second embodiment in conjunction with FIG. 6 wherein the same or similar parts are denoted by the same numbers as in the preceding embodiment. According to the second embodiment, the J-shaped hook portion 14 is substantially equal in width to the locking member 16, and the width the proximal part 10a of the hook body 10 is slightly less than the distance between the opposed side walls 23 of the locking member 16. The shoulders 51 are disposed slightly lower than the shoulder 31 in the first embodiment to thus provide a space 50 between the shoulder 51 of the J-shaped hook portion 14 and the edge of the locking member 16 adjacent to the inside edge of the J-shaped hook portion 14. The space 50 is adapted to let in the relevant edges of the opposed side walls 23 so as to permit the locking member 16 rotate clockwise as viewed in FIG. 6.

The proximal part 10a of the hook body 10 has a pair of small blind holes 55 one formed in each side and positioned above the shoulders 51. Each of the spiral springs 18 has a bent portion 18c formed on one end and bent inward. When the spiral spring 18 is mounted on the hook body 10, the bent portion 18c is fitted into the blind hole 55. Since the small blind holes 55 are positioned above the shoulders 51, the other end 18b of each spring 18 is completely concealed beneath the side walls 23 from the external view.

FIGS. 7 through 12 show a swivel hook according to the third embodiment. The same or similar parts are denoted by the same numbers as in the preceding embodiments. The swivel hook according to the third embodiment is substantially identical to that according to the first embodiment with some exceptions which will be described hereafter.

Figure 7:
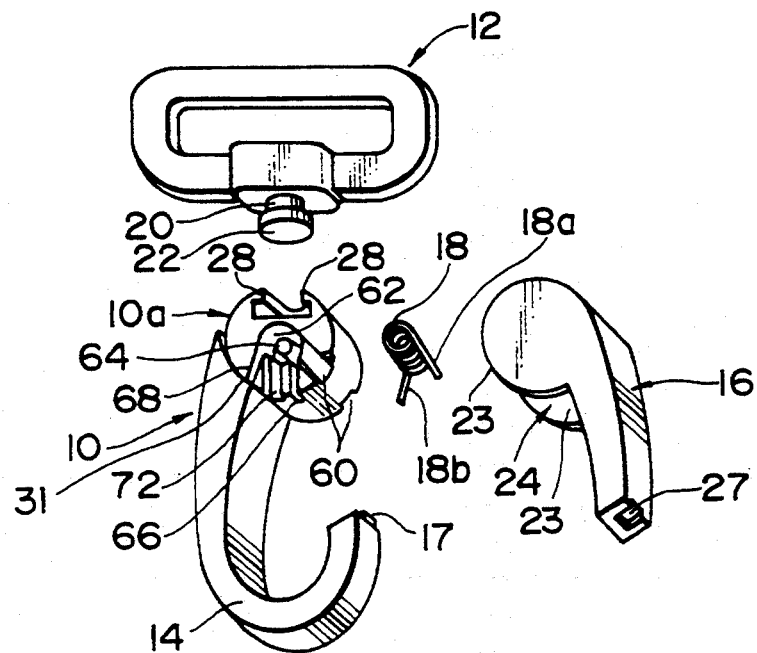
FIG. 7 is an exploded perspective view of a swivel hook according to the third embodiment of the present invention.
Figure 8:
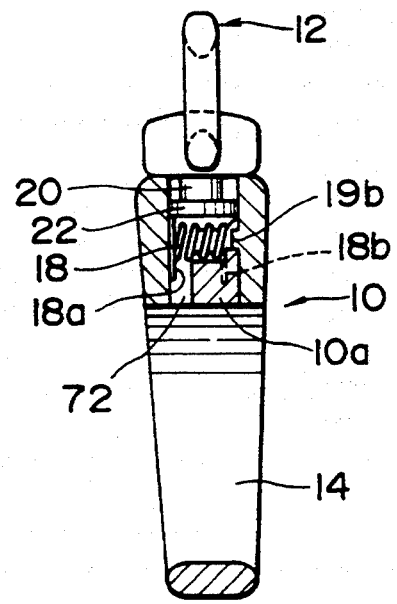
FIG. 8 is a longitudinal cross-sectional view of the swivel hook of FIG. 7.
Figure 9:
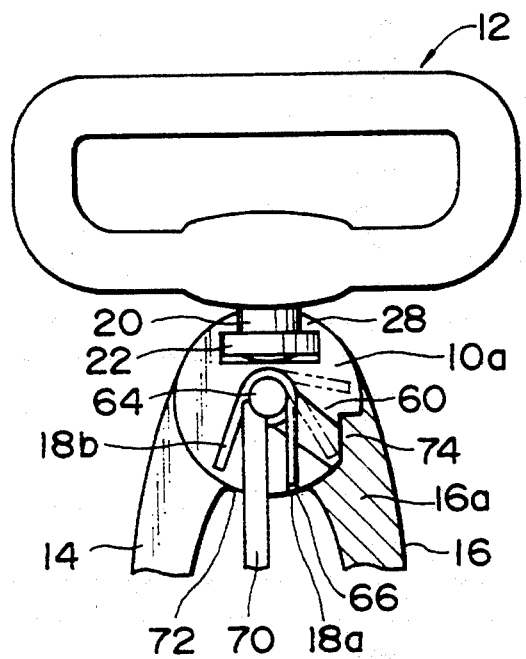
FIG. 9 is a fragmentary front view, partly in cross-section, of the swivel hook of FIG. 7.

A pair of confronting shafts 19a, 19b differ in length; one shaft 19a is longer than the other shaft 19b. As shown in FIG. 9, the lower solid portion 16a extends upward to provide an abutment 74 adapted for abutting engagement with the end 18a of the spiral spring 18. A pair of cylindrical bores (only a front bore 62 shown in FIG. 7) are formed one in each side of the proximal part 10a in the middle and is positioned coaxial to each other. The front bore 62 is deeper than the rear bore which is intended for receiving the shorter shaft 19b. As shown in FIG. 7, a cylindrical pillar 64 is mounted on the bottom of the front bore 62 and positioned coaxial with the front cylindrical bore 62. The cylindrical pillar 64 extends outward but terminates short of the outer edge of the front bore 62 so that, when the longer shaft 19a is inserted into the front cylindrical bore 62, the longer shaft 19a and the cylindrical pillar 62 jointly constitutes a supporting axle around which the body of the spiral spring 18 is loosely mounted. A deep groove 68 is formed in the proximal part 10a of the hook body 10 and extends from the cylindrical bore 62 toward the hook portion 14 but terminates at the shoulder 31. The deep groove 68 is as deep as the front cylindrical bore 62 for the purpose of receiving the other end 18b of the spiral spring 18 when the spiral spring 18 is received in the cylindrical bore 62. A pair of opposing front and rear shaft-passages 60, 60 are formed in the front and rear sides, respectively, of the proximal part 10a and extend at an angle downward from the cylindrical bore 62 to the inner edge of the proximal part 10a for permitting the opposed shafts 19a, 19b to pass therethrough into the cylindrical front and rear bores 62. Two juxtaposed first and second shallow recesses 72, 66 are formed between the deep groove 68 and the front shaft passage 60 of the proximal part 10a and extend downward from the cylindrical bore 62 to the inner edge of the proximal part 10a. The first shallow recess 72 is intended for letting in a separate handling pin 70 for handling the spring 18 during the assemblage of the swivel hook as closely described hereinbelow. The second shallow recess 66 is intended to tentatively receive the end 18a of the spiral spring 18a during assembling of the swivel hook. The J-shaped hook portion 14 has a fitting projection 17 mounted on the tip thereof. The locking member 16 has a fitting recess 27 formed in the lower end thereof for fitting engagement with the fitting projection 17 of the J-shaped hook portion 14.

Figure 10:
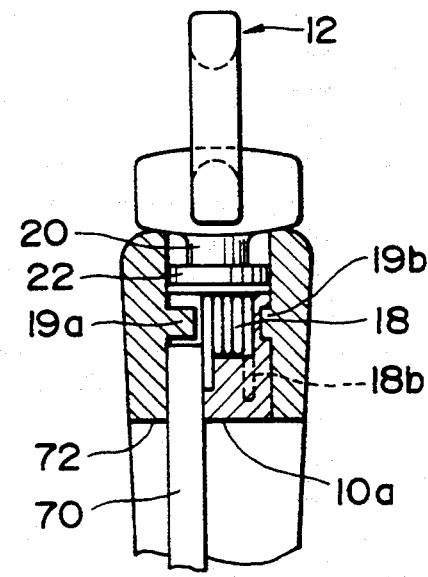
FIG. 10 is a fragmentary cross-sectional view of the swivel hook of FIG. 7.

In order to assemble the swivel hook according to the third embodiment of the present invention, as shown in FIGS. 9 and 10, the spiral spring 18 is received into a space defined between the front cylindrical bore 62 and the coaxial the cylindrical pillar 64 with the end 18b fitted into the deep groove 68. Then, the separate handling pin 70 is placed on the spiral spring 18 and presses the spiral spring 18 against the bottom of the front cylindrical bore 62 against the bias of the spiral spring 18 until the separate handling pin 70 is placed flat along the first shallow recess 72. In this instance, the end 18a of the spiral spring is tentatively placed in the second shallow recess 66. Then, the connecting axle 20 and the enlarged head 22 are inserted into the inverted T-shaped aperture 28 so that the enlarged head 22 is engaged with the opposing overhangs 28, 28. Subsequently, the proximal part 10a of the hook body 10 is inserted into the chamber 24 of the locking member 16 with the shaft-passages 60, 60 of the former passed by the opposing shafts 19a, 19b of the latter, until the opposing bores 64 of the former come into coaxial relation to the shafts 19a, 19b of the latter. Pulling off the handling pin 70 along the first shallow recess 72 causes the spiral spring 18 to expand along the coaxial cylindrical pillar 64 under resiliency. As a result, the spiral spring 18 comes into covering engagement with the longer shaft 19a and the end 18a of the spring 18 comes out of tentative locking engagement with the second shallow recess 66 and comes into abutting engagement with the abutment 74 of the locking member 16 under the resiliency of the spiral spring 18, so that the locking member 16 is rotated counterclockwise under the bias of the spring 18, bringing the lower end 16a of the locking member 16 into locking engagement with the tip of the J-shaped hook portion 14, as shown in FIG. 9. In this instance, the fitting recess 27 of the locking member 16 comes into fitting engagement with the fitting projection 17 of the J-shaped hook portion 14. This completes the assembling of the swivel hook according to the third embodiment of the present invention.

Figure 11:
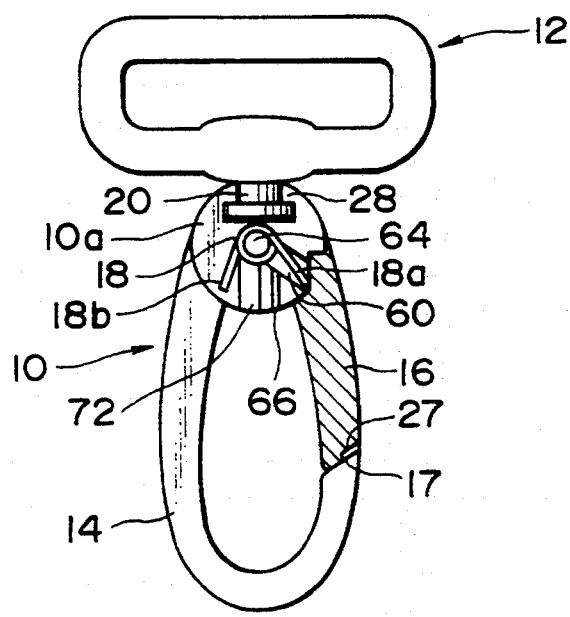
FIG. 11 is a front view, partly in cross-section, of the swivel hook of FIG. 7, showing the swivel hook in closing disposition.
Figure 12:
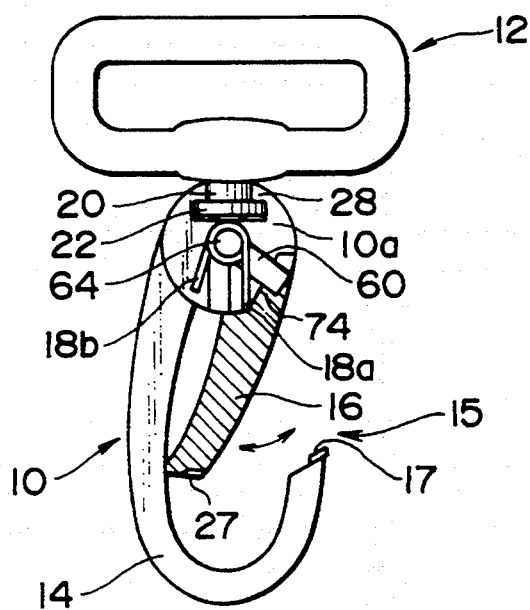
FIG. 12 is a view similar to FIG. 11 but showing the swivel hook in opening disposition.

Usage of the swivel hook according to the third embodiment is described in conjunction with FIGS. 11 and 12. Normally, the lower end 16a of the locking member 16 keeps in locking engagement with the tip of the J-shaped hook portion 14 under the bias of the spiral spring 18. In order to hang a separate ring to the J-shaped hook portion 14, the locking member 16 is rotated clockwise, as viewed in FIG. 11, against the bias of the spiral spring 18 to thus open the gap 15. Then, the separate ring is fitted into the hook portion 14 through the gap 15. Thereafter, if the locking member 16 is released, this will cause the locking member 16 rotate counterclockwise, as viewed in FIG. 12, under the bias of the spiral spring 18, thus bringing the lower end 16a of the locking member 16 into locking engagement with the tip of the J-shaped hook portion 14.

In addition to the advantages enjoyed by the preceding embodiments, the swivel hook according to the third embodiment has an additional advantage: the cylindrical bore can accommodate a longer spring with more turns, providing a more intensive biasing force. Therefore, biasing force of the spring 18 will be less likely to weaken even if used for a long time.

Now, the fourth embodiment of the present invention will be described hereinbelow in conjunction with FIGS. 13 through 16. The swivel hook according to the fourth embodiment is substantially identical with that according to the first embodiment except for the construction of the spring and part of the proximal part 10a of the hook body 10.

The spring 18 comprises a substantially U-shaped central spring body 18g, a pair of spiral portions 18e, 18e formed integrally with one on each end of the spring body 18g and a pair of inward bent portions 18d, 18d integrally formed with the spiral portions 18e, 18e, respectively.

Figure 13:
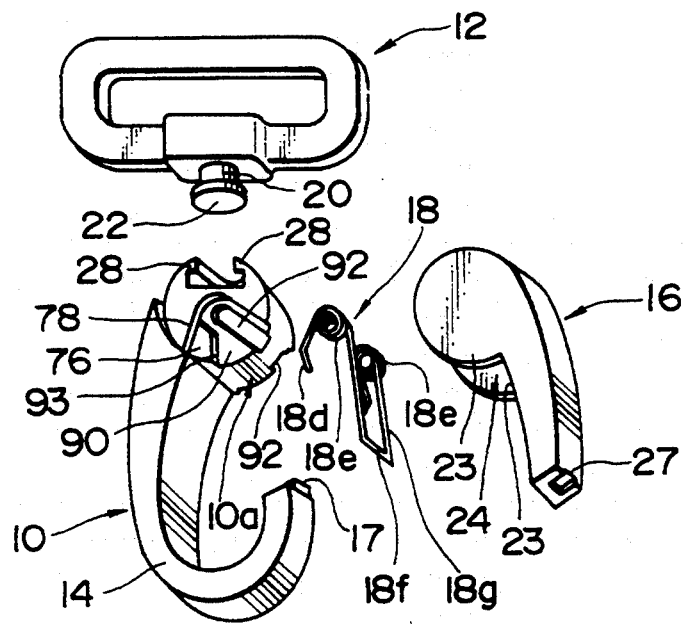
FIG. 13 is an exploded perspective view of a swivel hook according to the fourth embodiment of the present invention.
Figure 14:
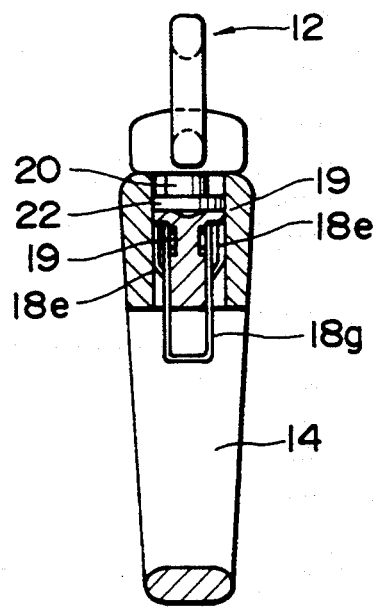
FIG. 14 is longitudinal cross-sectional view of the swivel hook of FIG. 13.
Figure 15:
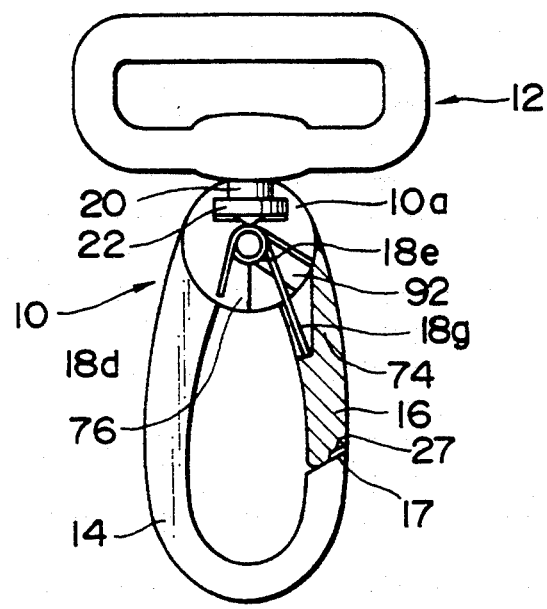
FIG. 15 is a front view, partly in cross-section, of the swivel hook of FIG. 13 but showing the swivel hook in closing disposition.
Figure 16:
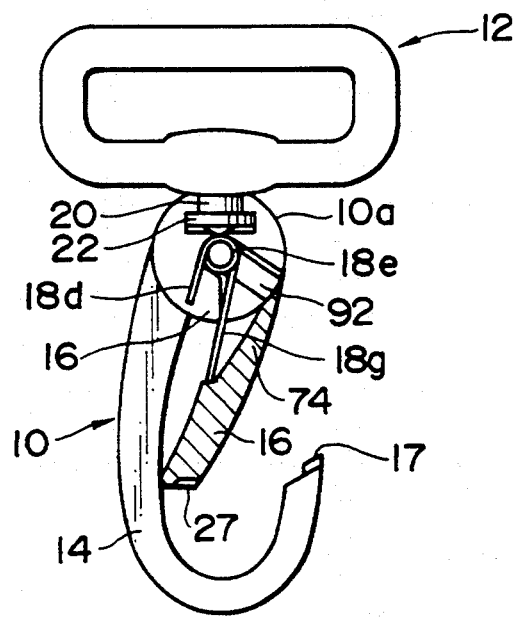
FIG. 16 is a similar to FIG. 15 but showing the swivel hook in opening disposition.

As better shown in FIG. 13, the proximal part 10a of the hook body 10 has a pair of recesses 90, 90 formed one in each side of the proximal part 10a and positioned on the front edge thereof. A rear groove 78 is formed along the rear edge of each recess 90. A raised area 76 is mounted on the recess 78 at the lower edge. A beveled surface 93 is formed in the front edge of the raised area 76. A slant groove 92 is formed at each recess 90 and positioned slightly above the raised area 76. The slant groove 92 extends at an angle downward and terminates in the front edge of the proximal portion 10a.

In order to put together the spring 18, the hook body 10 and the locking member 16, first of all, the pair of spiral portions 18e, 18e of the spring are wound around the shafts 19, 19. Then, the proximal part 10a of the hook body 10 is inserted into the chamber 24 of the locking member 16 with the slant grooves 92, 92 passed by the shafts 19, 19, respectively. As the proximal part 10a of the hook body 10 move into the chamber 24 of the locking member 16, the inward-bent portions 18d, 18d of the spring 18 first slide on the beveled surfaces 93 and then the upper surface of the raised area 76 against the bias of the U-shaped spring body 18g of the spring 18 until the inward-bent portions 18d, 18d reach the grooves 78, whereupon the inward-bent portions 18d, 18d comes into locking engagement with the respective grooves 78, 78 under the bias of the U-shaped spring body 18g. In this instance, the middle support portion 18f of the U-shaped central portion 18g comes into abutting engagement with the abutting wall 74 of the locking member 16. As a result, the locking member 16 is rotated clockwise, as viewed in FIG. 15, under the bias of the spiral portions 18e, 18e of the spring 18, thus bringing the lower end 16a of the locking member 16 into locking engagement with the tip of the J-shaped hook portion 14.

According to the fourth embodiment, since the middle support portion 18f of the spring 18 comes into contact with the abutting wall 74, over the width of the locking member 16, the biasing force of the spring 18 is transmitted to the locking member 16 uniformly over the entire width thereof. This helps to make stable rotation of the locking member 16 on the hook body 10.

Although the enlarged head 22 of the connecting ring 12 is shown to be cylindrical in the drawings, it may be of any suitable shape. Furthermore, apart from the spiral springs shown in the above embodiments, a plate spring or other types of springs may be used. Still furthermore, instead of providing spiral springs on both sides of the proximal part 10a of the hook body 10, only one spiral spring may be mounted on one side. In this event, a spacer staff may be provided on the other side for preventing the locking member 16 from rattling relative to the hook body 10. Furthermore, the biasing means may be formed integrally with the locking member 16.

With the construction of the swivel hook according to the present invention set forth above, the swivel hook enjoys the following advantages. A mere snapping of the locking member 16 can cause the connecting ring 12 to be joined with the hook body 10, dispensing with a tedious squeezing operation. This will decrease the number of steps needed to assemble the swivel hook. Furthermore, the force with which the connecting ring and the hook body 10 are engaged is very strong. In addition, the construction will provide freedom or flexibility to combine of connecting rings and hook bodies of various sizes and colors.

Obviously, various modifications and variations of the present invention are possible in the light of the above teaching. It is therefore to be understood that within the scope of the appended claims the invention may be practiced otherwise than as specifically described.

What is claimed is:

1. A swivel hook comprising;
   a hook body including a proximal part having an aperture formed at its upper end to define a pair of overhangs and a substantially J-shaped hook portion extending downward from the proximal part;
   a connecting ring having an connecting axle provided on one side thereof, the connecting axle having an enlarged head formed on its distal end, the enlarged head being inserted into the aperture into engagement with the overhangs;
   a locking member having a pair of opposing side walls to define therebetween a chamber; and
   biasing means mounted in the chamber;
   the proximal part of the hook body being pivotally mounted on the locking member within the chamber with the aperture closed by the opposing side walls and with the biasing means acting between the proximal part and the locking member for normally urging the locking member into engagement with the J-shaped hook portion.

2. A swivel hook according to claim 1, the opposing side walls having a pair of shafts formed one on each side wall on the interior surface and disposed in confronting relation to each other, the biasing means comprising a pair of spiral springs mounted on the respective shafts, each spiral spring having one end engaging the locking member and the other end engaging the hook body.

3. A swivel hook according to claim 1, the proximal part having a bore formed therein, the biasing means being a spiral spring received in the bore with one end engaging the proximal part and the other end engaging the locking member.

4. A swivel hook according to claim 1, the biasing means being a spring comprising a substantially U-shaped central spring body, a pair of spiral portions formed integrally with one on each end of the spring body and a pair of inward-bent portions integrally formed with the respective spiral portions, the spring mounted in the housing chamber with the inward-bent portions fastened to the respective opposed sides of the proximal portion and the middle support portion of the U-shaped central portion coming into abutting engagement with the abutting wall of the locking member.

* * * * *